Patented Feb. 13, 1923.

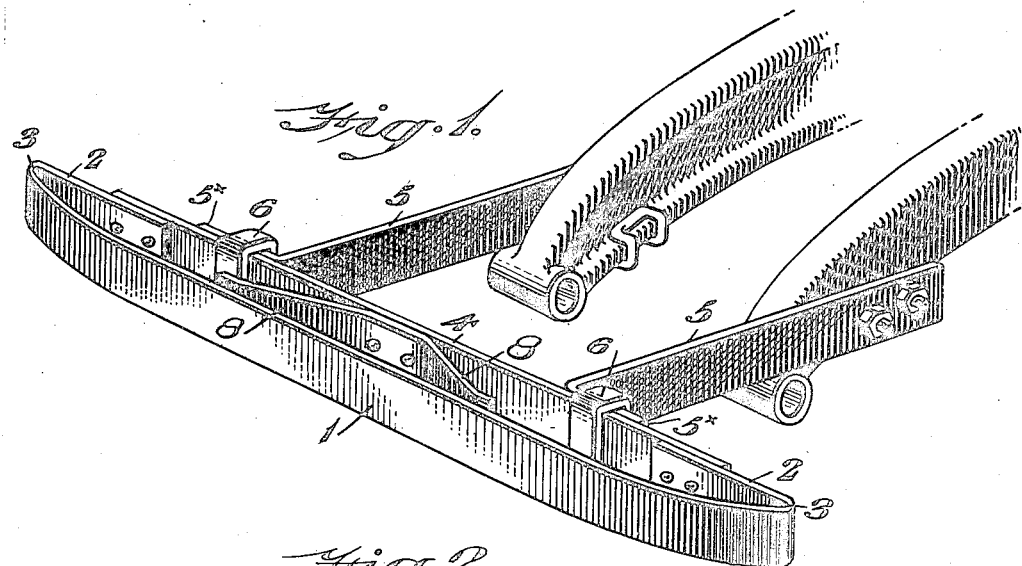
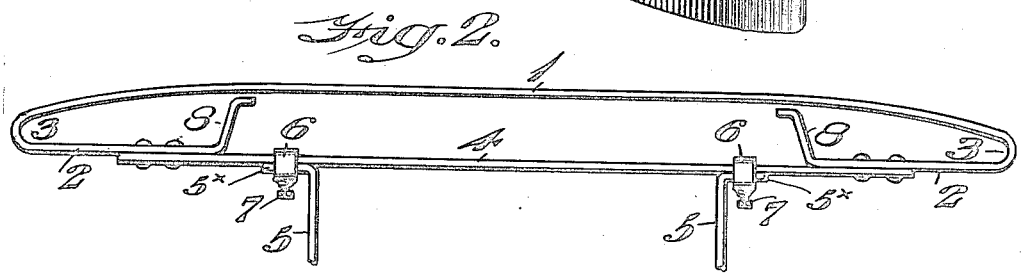
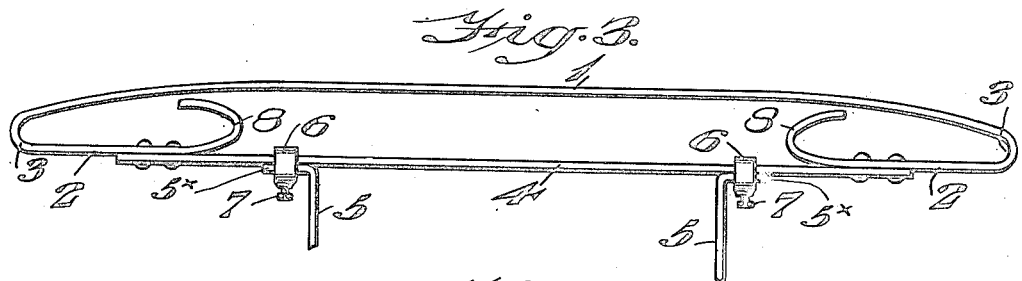
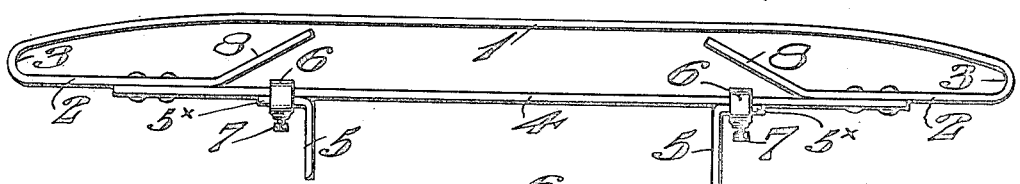
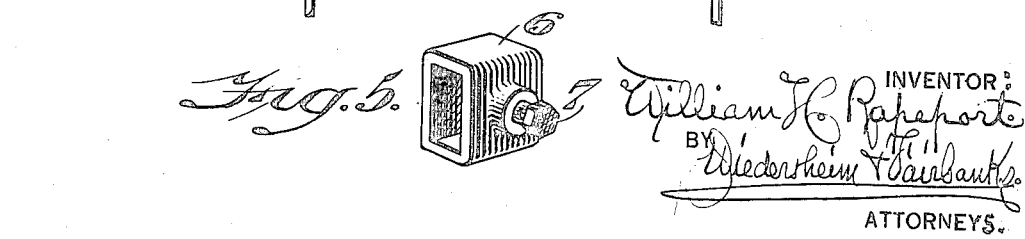

1,445,554

UNITED STATES PATENT OFFICE.

WILLIAM H. RAPEPORT, OF PHILADELPHIA, PENNSYLVANIA.

FENDER FOR AUTOS OR OTHER VEHICLES.

Application filed May 25, 1921. Serial No. 472,368.

*To all whom it may concern:*

Be it known that I, WILLIAM H. RAPEPORT, a citizen of the United States, residing in the city and county of Philadelphia, State of Pennsylvania, have invented a new and useful Fender for Autos or Other Vehicles, of which the following is a specification.

The invention consists of a fender for an automobile or other vehicle, the same being highly resilient in its nature so as to effectively receive shocks or blows, avoiding injury to the fender and vehicle, and possessing a comparatively rigid member which well supports the fender.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a fender for an automobile embodying my invention.

Figures 2, 3 and 4 represent top or plan views of various embodiments thereof.

Figure 5 represents a perspective view of a clamping or coupling member employed.

Similar numerals of reference indicate corresponding parts in the figures.

Referring to the drawings.

1 designates the front of the fender, the same consisting of a bar of sheet steel or other resilient metal or material, the terminal portions whereof are bent inturned forming limbs 2 which with said portions comprise the end loops 3 which are resilient in their nature.

Riveted or otherwise firmly connected with the terminal portions of said limbs is the piece 4 of metal or other suitable material which is bridged from the opposite limbs 2 rearward of the front bar 1 and so supports said limbs and consequently said front bar.

Extended rearwardly from said bridge piece 4 are the arms 5 which are rigidly connected or coupled with the same by means of the clamps 6 which embrace said piece, and the limbs 5ˣ on said arms and are held rigidly in position by set screws or bolts 7 which are fitted in the walls of the clamps and adapted to tighten against said limbs, it being noticed that said arms 5 are attachable to the chassis of the automobile and so supports the members of the fender in position on said chassis.

It is evident that the arms 5 and clamps 6 are movable to the right and left on the bridge piece so that said arms may be adjusted to the width of the portion of the chassis to which they are applied.

Intermediate of the front bar 1 and the bridge piece 4 are the resilient tongues 8 which when the bar 1 is subjected to shocks or blows are adapted to receive the impact of the same and thus provide additional resiliency for the body of the fender thereby breaking the effect of such shocks or blows, avoiding injury to the fender and chassis, and preventing severe jarring of the automobile.

As the terminals of the bridge piece extend laterally to the right and left of the clamps or couplings 6 and they join the resilient limbs 2 of the resilient loops 3, said terminals provide additional resiliency to the ends of the fender, but the portion of the said bridge piece intermediate of said clamps or couplings provides a rigid support for the fender on the arms 5, and thus the fender is well sustained on the latter, and consequently on the chassis and it will not sink from said arms since the bridge 4 is a rigid member as above stated, while the fender proper composed of the front resilient bar and inturned resilient rear limbs have full resiliency for the purpose stated.

In Figure 1, the tongues 8 are connected with the bridge piece and extend flaring in opposite directions therefrom.

In Figures 2, 3 and 4 said tongues are continuous of the inner terminals of the limbs 3 and extend therefrom flaring towards the front bar 1, so as to receive the impact of the latter when struck or otherwise subjected to shocks or blows.

Having thus described my invention what I claim as new and desire to secure by Letters Patent, is:—

1. A fender consisting of a resilient front bar, inwardly extending limbs on the end terminals of said bar, a comparatively rigid bridge piece separate from said limbs and disposed rearward of said bar adapted to connect said limbs, and resilient tongues on said limbs intermediate of said bridge piece and front bar.

2. A fender consisting of a resilient front bar, inwardly extending limbs on the end terminals of said bar, a comparatively rigid bridge piece separate from said limbs and disposed rearward of said bar adapted to connect said limbs, resilient tongues on said limbs intermediate of said bridge piece and front bar, arms adapted to support the fender and being connectible with a vehicle, and clamps with set screws adapted to couple said bridge piece with said arms.

3. A fender consisting of a resilient front bar, inwardly extending limbs on the end terminals of said bar, a bridge piece separate from said limbs and rigidly affixed to the rear faces of the ends thereof, and resilient tongues on said limbs intermediate of said bridge piece and front bar and being continuous of said limbs towards said front bar.

4. A fender consisting of a resilient front bar, inwardly-extending resilient limbs on the side terminals of said bar, a bridge piece adapted to connect said limbs, and resilient tongues on said limbs disposed intermediate of said bar and said bridge piece.

5. A fender consisting of a resilient front bar, inwardly-extending resilient limbs on the end terminals of said bar comparatively rigid, a bridge piece adapted to connect said limbs, and resilient tongues continuous inwardly of said limbs and disposed intermediate said front bar and said bridge piece.

6. A fender consisting of a resilient front bar, rear resilient limbs inturned from the side loops of the fender and separated from each other, a bridge piece of rigid material connected with said resilient limbs and forming continuities thereof, and an additional resilient member interposed between said rigid bridge piece and said front resilient bar, said rigid bridge piece being adapted to have the means for supporting the fender on the vehicle mounted thereon.

WILLIAM H. RAPEPORT.

Witnesses:
 JOHN A. WIEDERSHEIM,
 N. BUSSINGER.